United States Patent

Kobayashi et al.

[11] Patent Number: 6,091,904
[45] Date of Patent: Jul. 18, 2000

[54] PHOTOGRAPH PROCESSING APPARATUS

[75] Inventors: Kazuhiro Kobayashi, Sennan; Takuji Yamaguchi, Iwade-cho, both of Japan

[73] Assignee: Noritsu Koki Co., Ltd., Wakayama-ken, Japan

[21] Appl. No.: 09/331,630
[22] PCT Filed: Oct. 27, 1998
[86] PCT No.: PCT/JP98/04856
§ 371 Date: Jun. 23, 1999
§ 102(e) Date: Jun. 23, 1999
[87] PCT Pub. No.: WO99/22270
PCT Pub. Date: May 6, 1999

[30] Foreign Application Priority Data

Oct. 27, 1997 [JP] Japan ................................. 9-294492

[51] Int. Cl.$^7$ ................................................. G03B 17/00
[52] U.S. Cl. ............................................. 396/73; 359/821
[58] Field of Search .......................... 355/55; 396/71–75; 359/821, 819

[56] References Cited

FOREIGN PATENT DOCUMENTS

| 50-99930 | 8/1975 | Japan . |
| 52-70447 | 5/1977 | Japan . |
| 2-13937 | 1/1990 | Japan . |
| 7-333734 | 12/1995 | Japan . |

*Primary Examiner*—D. Rutledge
*Attorney, Agent, or Firm*—Jordan and Hamburg LLP

[57] ABSTRACT

A main lens 500 and an auxiliary lens 550 are selectively loaded on a lens loading section 601 of a lens moving deck 600. The lens moving deck 600 is movable in a certain direction to selectively set the lens loading section 601 at an exposed position and a retracted position adjacent to each other. A lens storage deck 700 is provided adjacent the retracted position to load the main lens 500 thereon for housing.

9 Claims, 11 Drawing Sheets

FIG. 7A
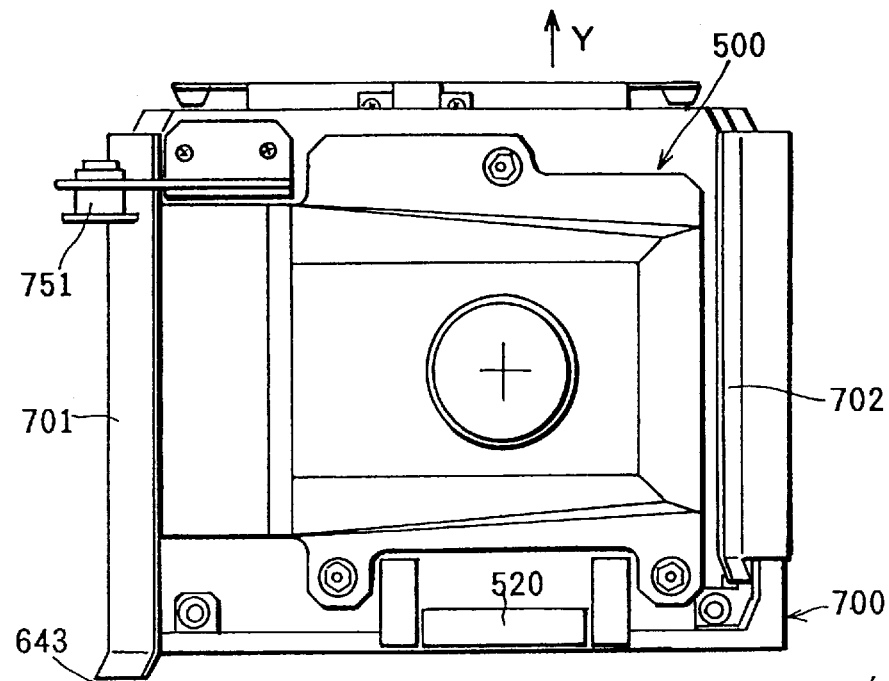
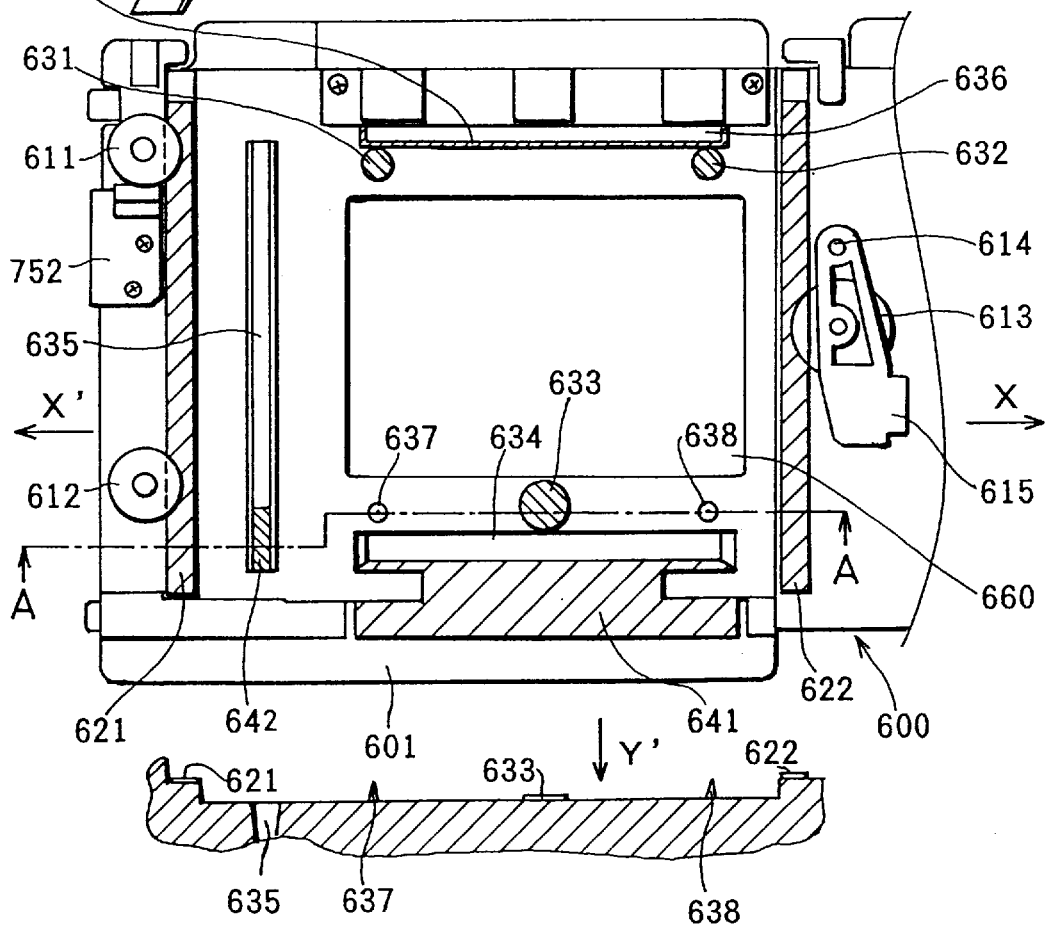
FIG. 7B

PHOTOGRAPH PROCESSING APPARATUS

FIELD OF THE INVENTION

This invention relates to a photographic processor (photo printing apparatus) used in a photographic processing laboratory and the like, and more particularly to an enlarging lens exchange mechanism used in a photographic processor that enables exchange of an enlarging lens between a zoom lens and a focus lens having a predetermined single focal length according to needs.

BACKGROUND ART

FIG. 10 shows a schematic construction of a photographic processor of prior art. As shown in FIG. 1, a photosensitive material (a roll of photographic paper) 10 is accommodated in a magazine. The magazine is loaded on a top part of the photographic processor 1. The photosensitive material 10 fed out from the magazine is fed into a dark room 2 through the top part of the photographic processor 1 and cut by a cutter 4 to obtain a cut sheet of photographic paper with a certain size. The cut sheet of photosensitive material 10 is transported onto an exposure table 3.

The exposure table 3 is installed in such a way that an exposing plane thereof has an inclination of about 45 degrees relative to the ground. An enlarging lens unit 20 is provided in a state that an axis of lens L thereof is orthogonal to the exposing plane of the exposure table 3, namely, with a lens surface thereof opposing the exposing plane of the exposure table 3 tilted at about 45 degrees relative to the ground. A light source 11 is provided in such a manner that light emitted therefrom intersects substantially perpendicularly to the optic axis L of the enlarging lens unit 20 by way of a mirror unit 12. A film feed mechanism (not shown) for feeding a negative film is disposed between the light source 11 and the enlarging lens unit 20. An operation panel 13 and a display monitor device 14 are provided in the vicinity of the light source 11 and the enlarging lens unit 20.

The photosensitive material 10 after the exposure is transported to a developing unit 30 by a transport mechanism 5 such as a belt, and is subjected to various processing such as developing, bleaching/fixing, stabilizing, and drying. Upon completion of these various processing, the photosensitive material 10 is discharged onto the top part of the photographic processor 1.

Next, the construction of the enlarging lens unit in the conventional photographic processor 1 is described in detail with reference to FIG. 11. The enlarging lens unit 20 is equipped with a lens moving deck 21 that is movable in a certain direction X–X' (for instance, the direction perpendicular to the plane of FIG. 10) by, e.g., a ball screw mechanism or a belt drive mechanism (both not shown), a main lens 22 such as a zoom lens loaded on the lens moving deck 21, a mirror 23, and an auxiliary lens 24 such as a focus lens having a predetermined single focal length (hereafter, referred to as a "single-distance focus lens"). The lens moving deck 21 is divided into three sections: a center area (a mirror loading section B) on which the mirror 23 is loaded; a left-hand area in FIG. 11 (a first lens loading section A) on which the main lens 22 is loaded; and a right-hand area (a second lens loading section C) on which the auxiliary lens 24 is loaded.

The main lens 22 such as a zoom lens enables to process two kinds (sizes) of photographs by a single photographic processor by desirably switching a focal length (angle of view) in the case where a film to be processed has the size "135" and contains images taken under normal size photography and panoramic photography in a combined manner. The auxiliary lens 24 such as a single-distance focus lens is used, for instance, in the case where the film of the size "120" having a large image area (namely, frame size) is processed or the enlarging magnification is great. The mirror 23 is adapted to deflect a light path that passes through an opening 50 and the film set in such a way as to oppose the opening 50 at about right angle and guide the deflected light to a light sensor 25. The light sensor 25 detects the state of the film, namely, each component of three primary colors of the film. The ratio of each color component and exposed time when each image was exposed are determined based on an output from the sensor 25.

In the conventional photographic processor having the above arrangement, the lens moving deck 21 has a large dimension and heavy weight because the main lens 22 and the auxiliary lens 24 are loaded on the lens moving deck 21 on any occasion. Further, while the main lens 22 is, for instance, set at an exposed position opposing the film 50 (sic) (the location corresponding to the mirror loading section B), the mirror 23 and the auxiliary lens 24 are required to be retracted from the exposed position. Similarly, while the auxiliary lens 24 is set at the exposed position, the main lens 22 and the mirror 23 are required to be retracted from the exposed position. This arrangement necessitates a large space for moving the lens moving deck 21 in X–X' direction in FIG. 1 covering a length about 5/3 times of the length of the lens moving deck 21, and inevitably enlarges the width of the photographic processor (dimension extending in the direction normal to the plane of FIG. 10).

Also, the kind (size) Of film to be processed in the processing laboratory on everyday basis is mainly "135" size, and the film having a large image area such as the film of "120" size is seldom processed. Accordingly, the frequency of using the auxiliary lens is extremely low, and there is no significance of loading the auxiliary lens 24 of less use on the lens moving deck 21 on any occasion. Further, there are various frame sizes concerning the film with the size "120" or its equivalent such as 6×4.5, 6×6, 6×7, and 6×9 (unit in centimeter). This necessitates preparing several kinds of auxiliary lens 24 having different focal lengths and different diameters of image circles corresponding to the lenses and selectively loading the auxiliary lens 24 suitable for the needed frame size. The lens exchange has been, however, difficult because the optic lens L of the enlarging lens unit 20 is tilted relative to the ground at about 45 degrees as shown in FIG. 10.

DISCLOSURE OF THE INVENTION

In view of the above problems residing in the prior art, an object of this invention is to provide a photographic processor having an enlarging lens unit with a compact size, light weight and small installing area that facilitates exchange of a main lens and an auxiliary lens.

To accomplish the above object, the photographic processor of this invention comprises a lens moving deck including a lens loading section for selectively loading a main lens and an auxiliary lens. The lens moving deck is movable in a certain direction to selectively set the lens loading section at an exposed position and a retracted position adjacent to each other.

BRIEF DESCRIPTION OF THE DRAWINGS

FIGS. 7A and 7B are plan views showing the main lens loaded on the lens storage deck for housing in FIG. 4, FIG. 7B being a cross section taken along the line A—A in FIG. 7A;

BEST MODE FOR CARRYING OUT THE INVENTION

Figure 1:
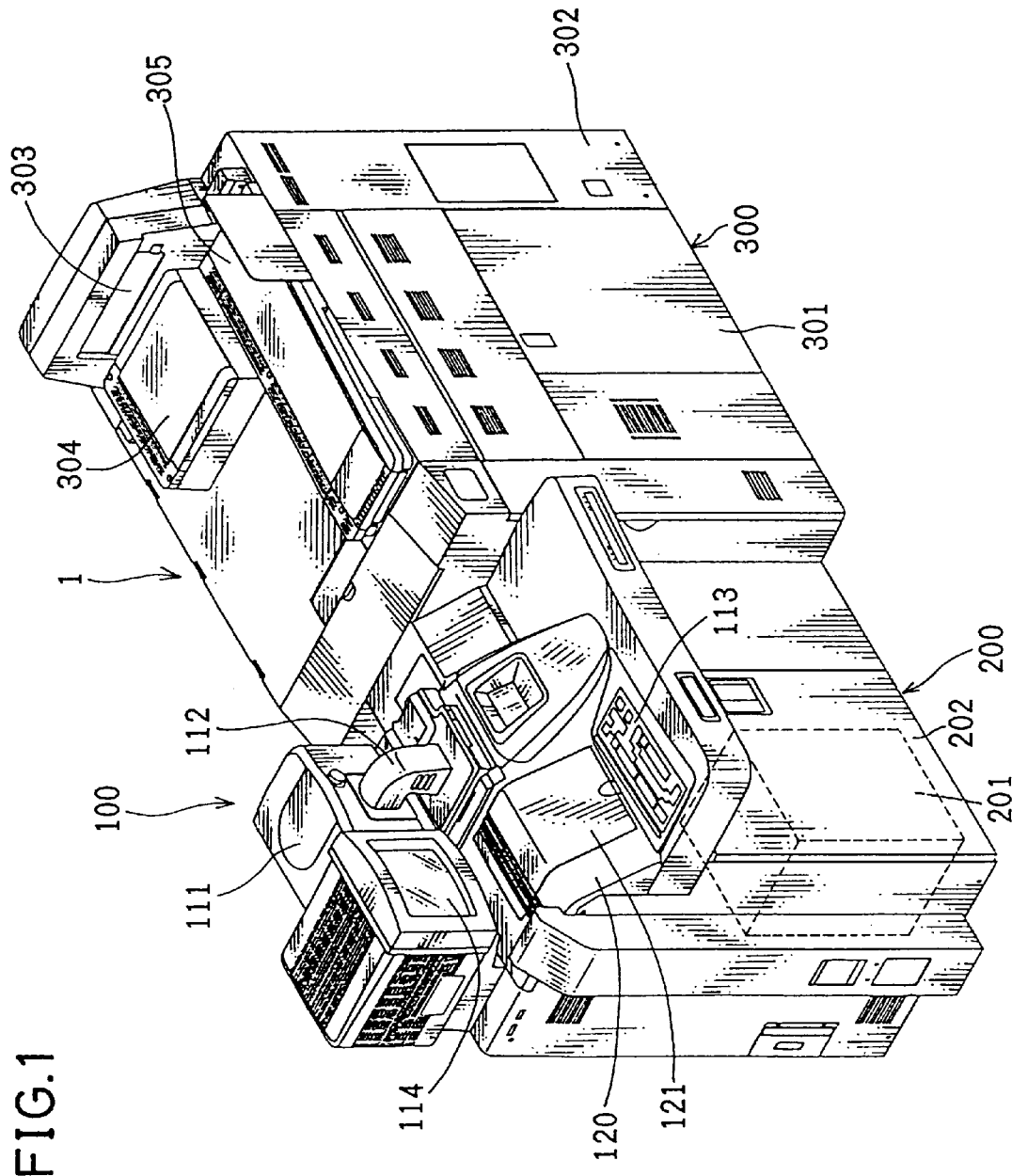
FIG. 1 is a perspective view showing an external appearance of a photographic processor according to an embodiment of this invention.

An embodiment of a photographic processor according to this invention is described with reference to the accompanying drawings. FIG. 1 is a perspective view showing an external appearance of the photographic processor as one embodiment. The photographic processor 1 includes an exposure unit 100, a photosensitive material handling unit 200, and a developing unit 300. The exposure unit 100 is used to enlargedly project an image on a film onto a photosensitive material (photographic paper) to expose the image. The photosensitive handling unit 200 is used to house a roll of photosensitive material therein, cut the photosensitive material to obtain a cut sheet with a certain size, and feed the cut sheet to the exposure unit 100. The developing unit 300 is used to develop, bleach/fix, rinse, and dry the photosensitive material after the exposure.

The photosensitive handling unit 200 is disposed underneath the exposure unit 100, and is loaded with a magazine 201 therein in which a roll of photographic paper is accommodated to prevent photosensitizing of the photographic paper. A roll of photosensitive material before use has, for instance, a length of about 180 m, and the total weight thereof including the magazine 201 weights as heavy as 14 Kgs. In order to cope with the heavy load, a pair of withdrawable guide rails (not shown) are provided in the photosensitive handling unit 200 behind a door 202 thereof to accommodate the magazine 201 loaded with the photosensitive material into the photosensitive handling unit 200. When the magazine 201 is loaded in the photosensitive handling unit 200, the photosensitive material is ready to be drawn out from the magazine 201, cut at a certain size by a cutter (not shown), and fed to the exposure unit 100.

The exposure unit 100 includes an enlarging lens unit to be described below, a light source 111, a mirror unit 112 for deflecting a light path from the light source at about right angle to guide the deflected light onto the enlarging lens unit, an operation panel 113, a display monitor device 114, and a housing member 120 for covering the enlarging lens unit to protect the enlarging lens unit from external light.

The developing unit 300 is used to develop, bleach/fix, stabilize, and dry the photosensitive material after the exposure. There should be prevented the photosensitive material from photosensitizing by stray light coming from outside in at least an entire stage of developing and an initial stage of bleaching/fixing. Accordingly, the developing unit 300 is composed of two-parts unit consisting of a dark room part 301 in which at least the developing, the bleaching/fixing, and the stabilizing are effected and a dryer part 302 in which the drying is effected. After the drying, the photosensitive material (namely, photographs) is discharged onto a first transport belt 304 through a discharge port 303 at a top part of the developing unit 300 in such a manner that a certain number of photographs corresponding to frame images recorded on a roll of film are stacked one over another in a set. In this way, upon completion of photographic processing of one roll of film, the set of photographs are carried onto a second transport belt 305 from the first transport belt 304 and held thereat. The transport belt 305 has an area to hold several sets of photographs corresponding to several rolls of film.

Figure 2:
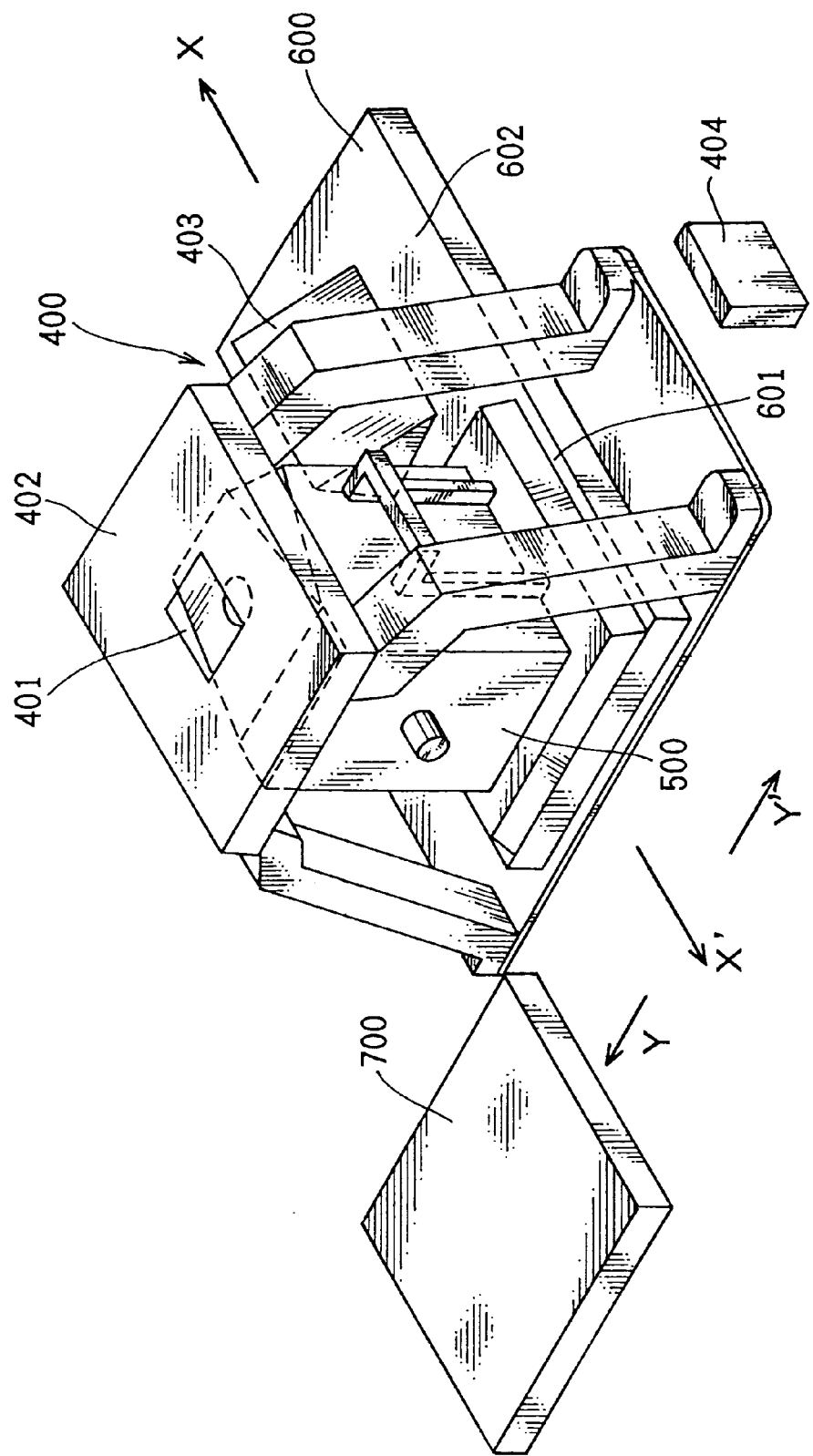
FIG. 2 is a perspective view showing a state that a main lens is set at an exposed position in the photographic processor.
Figure 4:
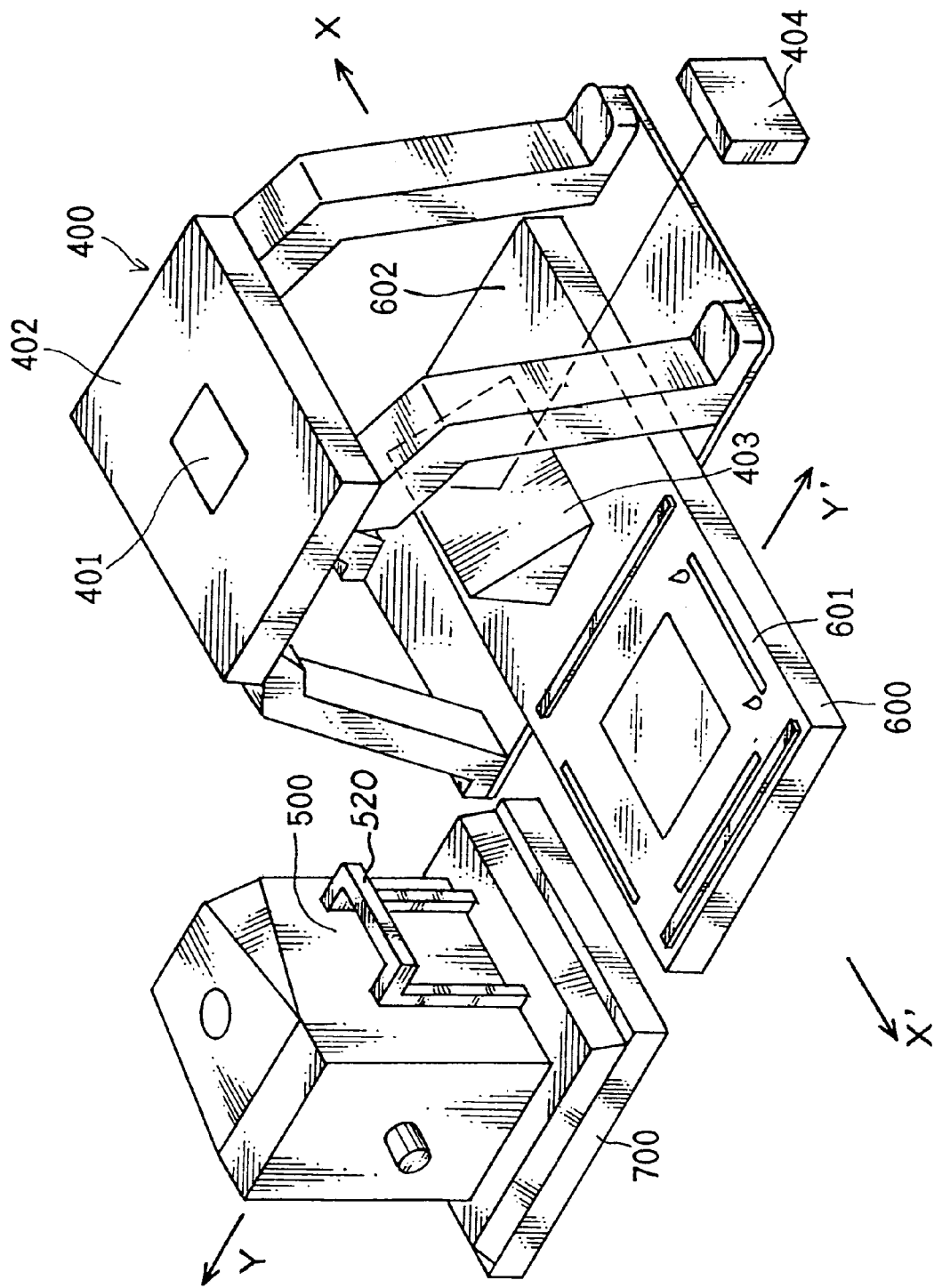
FIG. 4 is a perspective view showing a state that the main lens is loaded on a lens storage deck for housing in the photographic processor.
Figure 5:
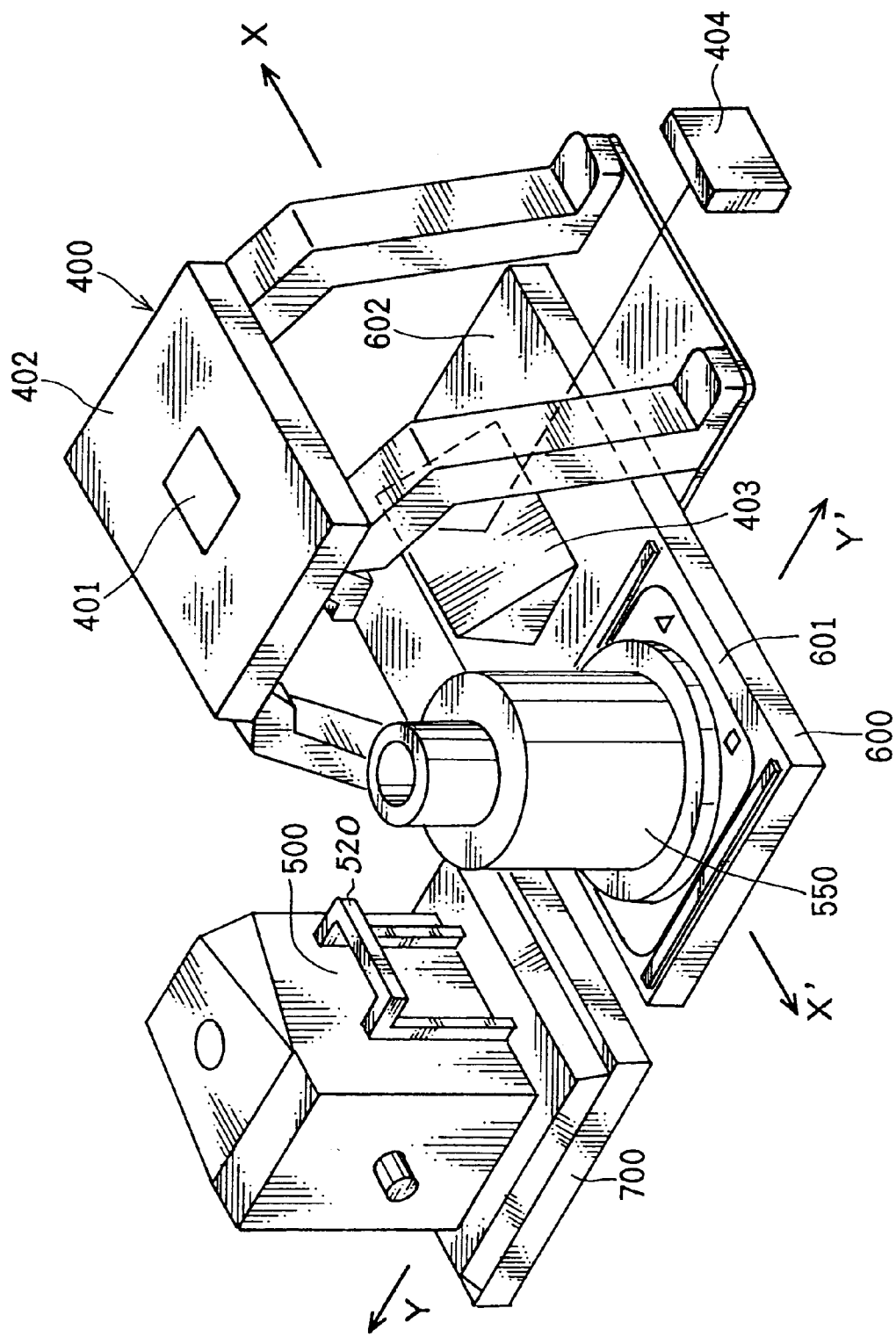
FIG. 5 is a perspective view showing a state that an auxiliary lens is loaded on a lens loading section of a lens moving deck in the photographic processor.

Next, a construction of the enlarging lens unit 400 is described. FIG. 2 shows a state that the main lens 500 is set at an exposed position, FIG. 3 shows a state that the main lens 500 is set at a retracted position, FIG. 4 shows a state that the main lens 500 is loaded on a lens storage deck 700 for housing, and FIG. 5 shows a state that an auxiliary lens 550 is loaded on the a lens loading section 601 of the lens moving deck 600.

As depicted in each figure, the enlarging lens unit 400 is composed of the following components. A film holder 402 is used to transport a film to be processed (negative film or positive film) to hold the film at a position opposing an opening 401 formed at a predetermined position of the film holder 402. The lens moving deck 600 is movable in a first direction X–X' when driven by a drive mechanism (not shown) such as a ball screw mechanism and a belt drive mechanism. The enlarging lens (the main lens 500 such as a zoom lens and the auxiliary lens 550 such as a single-distance focus lens is selectively loaded on the lens loading section 601 of the lens moving deck 600 (see FIG. 5). A mirror 403 is loaded on a mirror loading section 602 of the lens moving deck 600 to deflect a path of light that passes the opening 401 and the negative film set at a position opposing the opening 401 at about right angle for guiding the light onto a photosensor 404. A lens storage deck 700 is provided adjoining the lens loading section 601 in a second direction Y–Y' substantially orthogonal to the first direction X–X' to load the main lens for housing when the lens loading section 601 of the lens moving deck 600 is set at a retracted position (see FIG. 3).

The weight of a zoom lens as an example of the main lens 500 is about 3 Kgs, and the weight of a single-distance focus lens as an example of the auxiliary lens 550 is about 1.5 Kgs. Both the main lens 500 and the auxiliary lens 550 are operable with one hand. It should be noted, however, that the main lens 500 is equipped with a motor and a drive mechanism for moving a part of an optic system of the zoom lens. It is required to connect a cable and a connector with the motor to transmit a drive power, a control signal and the like to the motor. For the above purpose, this embodiment adopts an arrangement such that there is less need of detaching the main lens 500 from the photographic processor 1 as much as possible.

Figure 3:
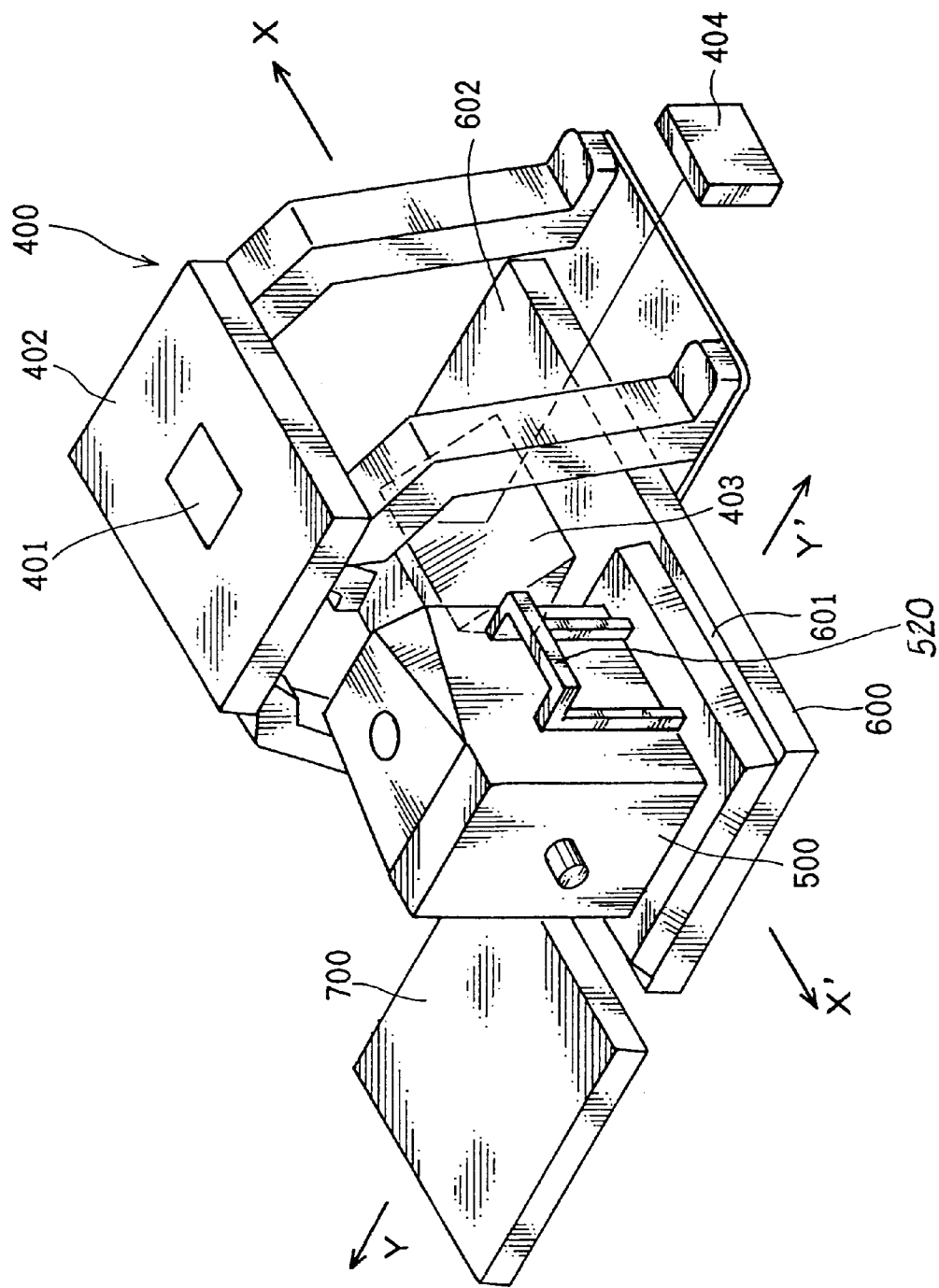
FIG. 3 is a perspective view showing a state that the main lens is set at a retracted position in the photographic processor.

The lens moving deck 600 is movable in opposite directions (X-direction and X'-direction of the first direction X–X') between the position shown in FIG. 2 and the position shown in FIG. 3 by a drive mechanism (not shown). The position shown in FIG. 2 is such that the main lens 500 is set at the exposed position and the mirror 403 is retracted. When the main lens 500 is set at the exposed position, an image on the film is enlargedly projected onto the photosensitive material (photographic paper) by controlling the light source to expose the photosensitive material. On the other hand, the position shown in FIG. 3 is such that the main lens 500 is set at the retracted position and the mirror 404 (sic) is set at the exposed position. When the main lens 500 is set at the retracted position, light that passes through the film is reflected by the mirror 403 and incident upon the photosensor 404. The photosensor 404 detects the state of the film, namely each component of three primary colors of the film. The ratio of each color component and exposed time when the image was exposed is determined based on an output from the photosensor 404.

As clear from each figure, the main lens 500 is selectively loaded on the lens loading section 601 of the lens moving deck 600 or loaded on the lens storage deck 700 for housing. In both cases, the main lens 500 is accommodated inside the enlarging lens unit 400. On the other hand, the auxiliary lens 550 is, as shown in FIG. 5, loaded on the lens loading section 601 of the lens moving deck 600 only when the main lens 500 is loaded on the lens storage deck 700 for housing. In the photographic processor of this embodiment, the main lens 500 is generally used as the enlarging lens, whereas the auxiliary lens 550 is stored outside the photographic processor.

The enlarging lens unit 400 is provided in a housing member 120 shown in FIG. 1. The film holder 402 is provided below the mirror unit 112. Since the main lens 500 is required to slide in the second direction (Y–Y' direction) in this embodiment, the enlarging lens unit is arranged such that the first direction X–X' and the second direction Y–Y' are set in horizontal (to the ground). Thereby, an optic axis of the main lens 500 (or auxiliary lens 550) is set at right angle (orthogonal) to the ground. A lid 121 is provided on the housing member 120 at such a position as to oppose the lens loading section 601 of the lens moving deck 600 of the enlarging lens unit 400. By opening the lid 121, it is enabled to slide the main lens 500 from the lens loading section 601 of the lens moving deck 600 to the lens storage deck 700 in the second direction (Y–Y' direction) or load the auxiliary lens 550 onto the lens loading section 601 of the lens moving deck 600 by manual operation.

Next, an operation of the embodiment is described. Generally, what is used frequently as the film size is the size "135". In addition, it is often the case that images photographed under normal photography and panoramic photography are recorded on one roll of film in a combined manner. That is why a zoom lens is loaded as the main lens 500 in the photographic processor 1 shown in FIG. 2. Altering the angle of view of the lens enables printing of photographs of two or more sizes without changing the enlarging lens.

In the case where an enlargement magnification larger than the generally used one is designated or images are to be printed from a negative film of the size other than the size "135", it is required to use the auxiliary lens 550 in place of the main lens 500. In this case, operating the operation panel 113 in FIG. 1 to drive a drive mechanism (not shown) so as to move the lens moving deck 600 in X'-direction enables shifting the lens moving deck 600 from the state shown in FIG. 2 to the state shown in FIG. 3.

Then, opening the lid 121 shown in FIG. 1, manually operating a handle 520 to slide the main lens 500 from the lens moving deck 600 toward the lens storage deck 700 in Y-direction shifts the lens moving deck 600 from the state shown in FIG. 3 to the state shown in FIG. 4. When the lens moving deck 600 is set at the state shown in FIG. 4, the lens loading section 601 is available for loading the auxiliary lens 550 as shown in FIG. 5. After loading the auxiliary lens 550 onto the lens moving deck 600, operating the operation panel 113 shown in FIG. 1 to drive the drive mechanism so as to move the lens moving deck 600 in X-direction locates the auxiliary lens 550 at the exposed position. Thereby, printing by the auxiliary lens 550 is enabled. In order to detach the auxiliary lens 550 and set the main lens 550 at the exposed position, an operation similar to the above operation is performed except that, at this time, the main lens is replaced with the auxiliary lens and the auxiliary lens is replaced with the main lens.

Figure 6:
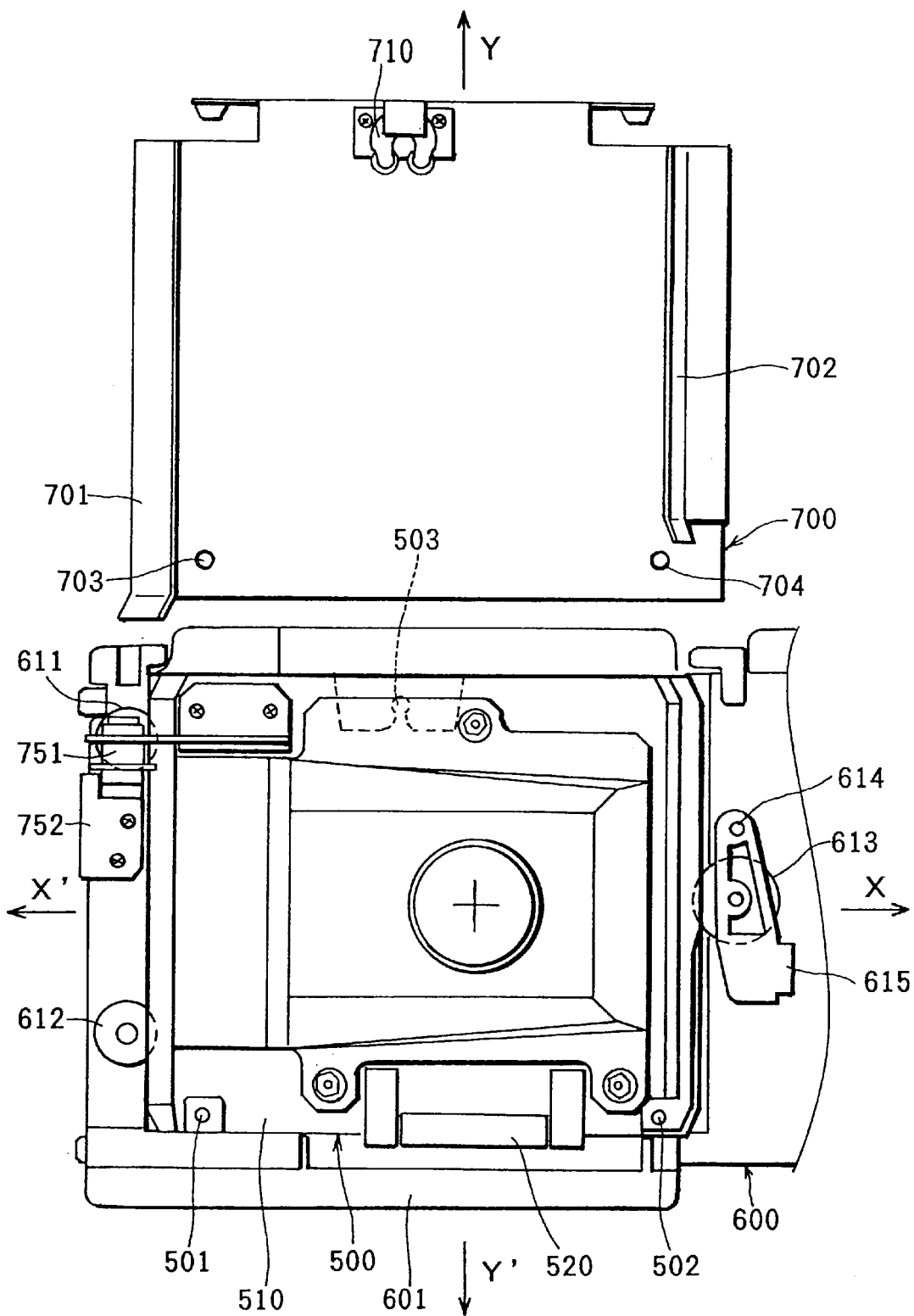
FIG. 6 is a plan view of the main lens set at the retracted position in FIG. 3.
Figure 8:
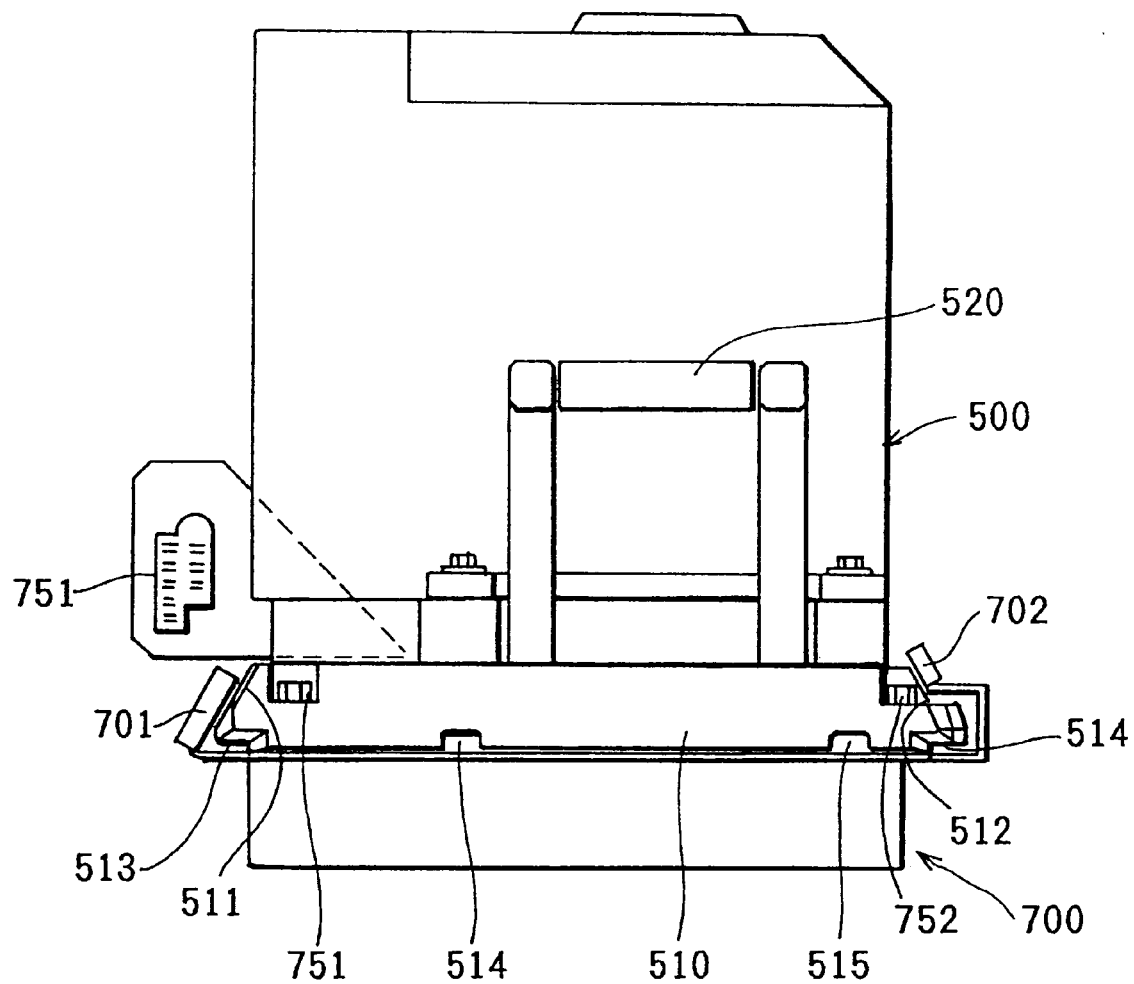
FIG. 8 is a front view showing a state that the main lens is fixedly loaded on the lens storage deck.
Figure 9:
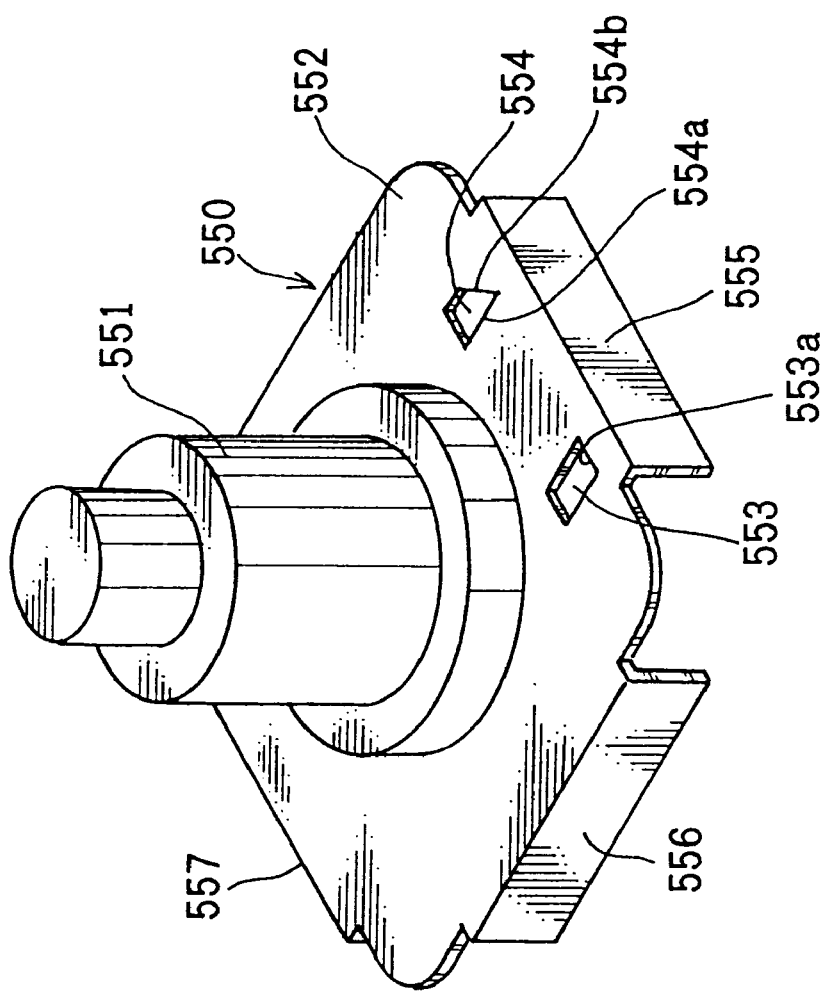
FIG. 9 is a perspective view showing an arrangement of the auxiliary lens.
Figure 10:
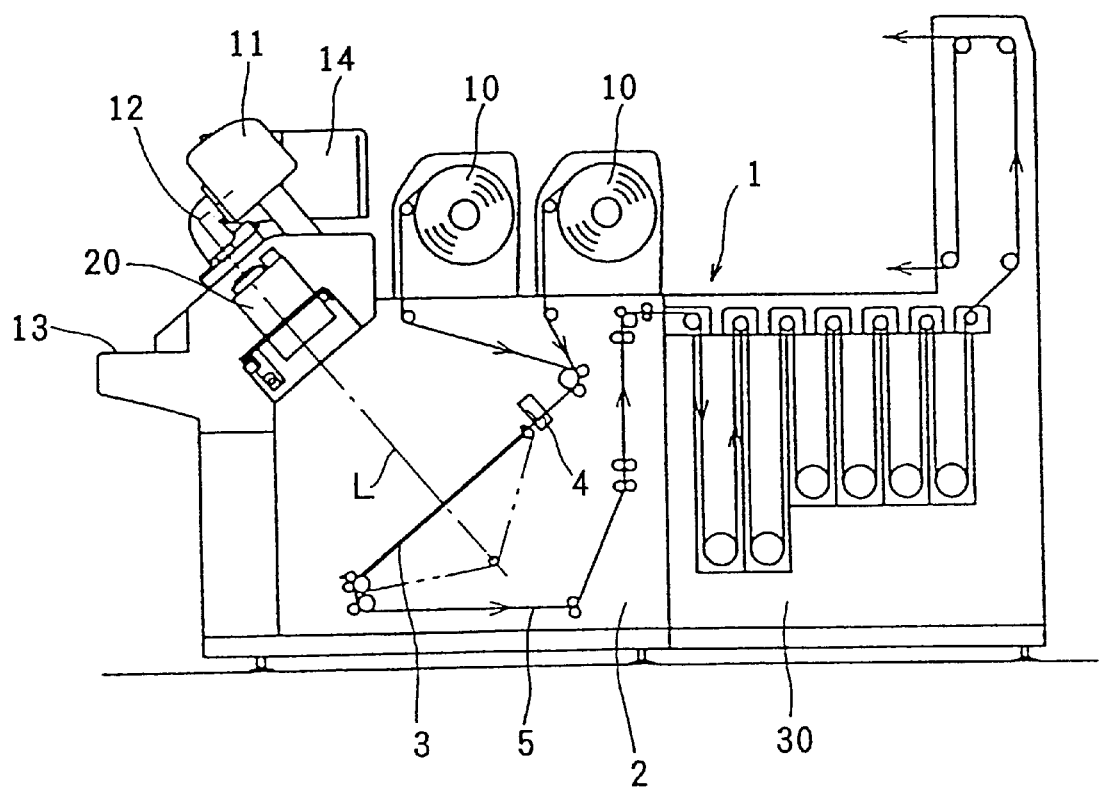
FIG. 10 is a cross section showing a schematic construction of a photographic processor according to prior art.
Figure 11:
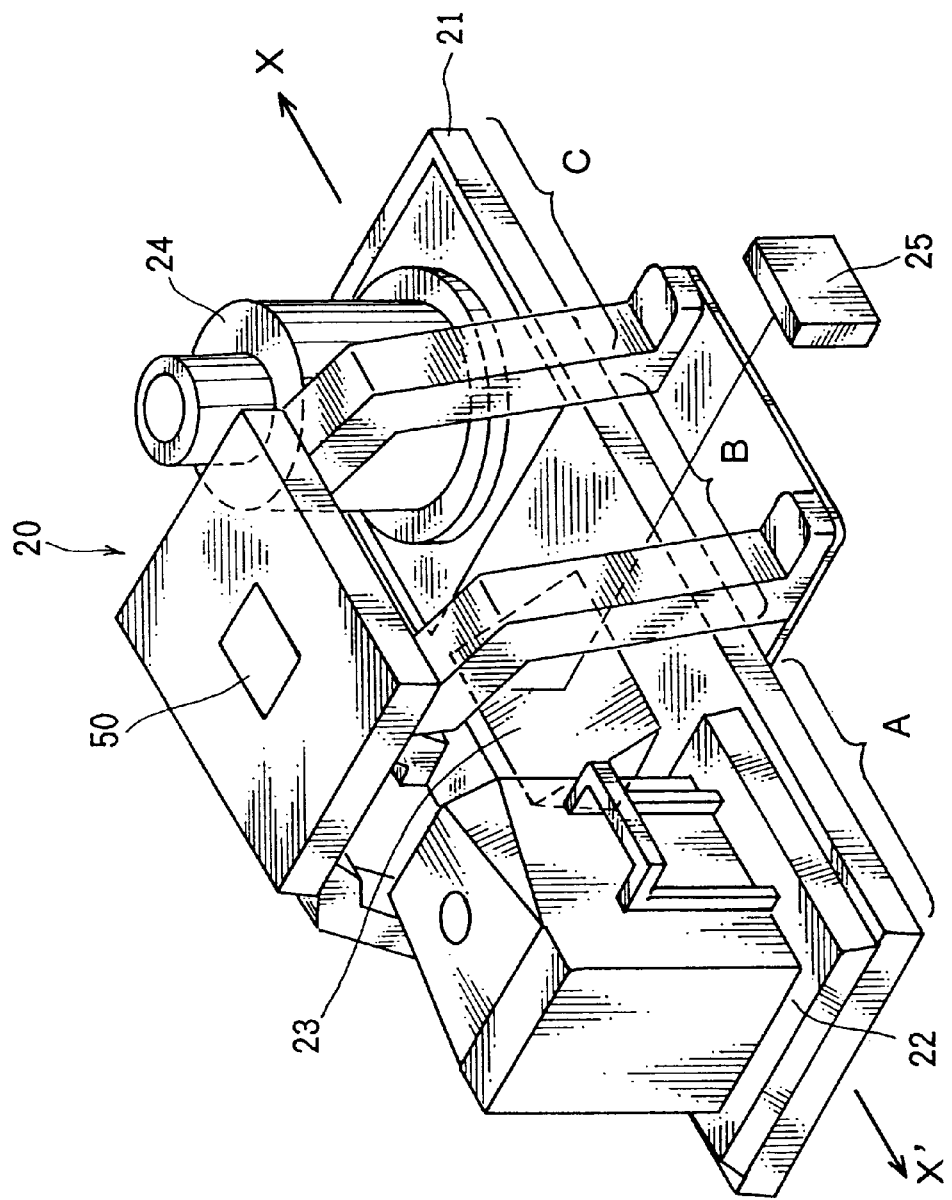
FIG. 11 is a perspective view showing an arrangement of a lens moving deck in the conventional photographic processor.

Next, the arrangement of the lens loading section 601 of the lens moving deck 600 is described with reference to FIGS. 6 to 9. FIG. 6 is a top plan view of the lens moving deck 600 when it is set at the state shown in FIG. 3. In FIG. 6, the main lens 500 is loaded on the lens loading section 601 of the lens moving deck 600. FIG. 7A is a top plan view of the lens moving deck 600 when it is set at the state shown in FIG. 4. In FIG. 7A, the main lens 500 is loaded on the lens storage deck 700. FIG. 7B is a cross section taken along the line A—A in FIG. 7A. FIG. 8 is a front view showing a state that the main lens 500 is fixed to the lens storage deck 700. FIG. 9 is a perspective view showing the arrangement of the auxiliary lens 550.

As shown in FIG. 8, opposite side parts 701, 702 in the first direction X–X' of the lens storage deck 700 have inward slopes respectively so as to be fittable with opposite side parts 511, 512 of a base 510 at a lower part of the main lens 500. As shown in FIG. 6, the lens storage deck 700 is formed with internal thread holes 703, 704 at positions corresponding to holes 501, 502 of the main lens 500. In this arrangement, as shown in FIGS. 7A and 8, screwing external screws 751, 752 into the internal thread holes 703, 704 attains fixation of the main lens 500 onto the lens storage deck 700.

Further, as shown in FIG. 6, the lens storage deck 700 is provided with a lock mechanism 710 that is engageable with a projection 503 formed at the main lens 500. The lock mechanism 710 has two arms urged in mutually closed direction by a spring or its like and a roller rotatable at a lead end of each of the arms. The lock mechanism 710 does not accomplish a complete fixation of the main lens 500 onto the lens storage deck 700, but enables to prevent falling off of the main lens 500 when a small impact is applied to the main lens 500 on the lens storage deck 700.

In the case where the main lens 500 is a zoom lens with a part of an optic system thereof variably movable, a motor and a drive mechanism to drive the part of the optic system are provided in the main lens 500. In this arrangement, as shown in FIGS. 6 and 7A, detachably attaching connectors 751, 752 onto the main lens 500 and the lens loading section 601 of the lens moving deck 600 respectively enables electrical connection and disconnection simultaneously with sliding of the main lens 500 between the lens loading section 601 of the lens moving deck 600 and the lens storage deck 700.

Next, a description as to how the main lens 500 is positioned on the lens loading section 601 of the lens moving deck 600 is provided.

As shown in FIGS. 6 and 7A, three rollers 611, 612, 613 are provided on the lens loading section 501 of the lens moving deck 600 to position the lens in the first direction X–X' and second direction Y–Y'. The non-displaceable rollers 611, 612 are rotatably supported directly on the lens moving deck 600. The displaceable roller 613 is rotatably supported on an arm 615 that pivots about an axis 614. The arm 615 is applied with a force directed in X'-direction in the figures by a spring or its like (not shown).

A guide portion (for instance, a recess) is formed in a side part of the base 510 of the main lens 500 at a position corresponding to each of the rollers 611, 612, 613. (This arrangement is obviously known to the person in the art, and hence not depicted in the drawings). Engagement of the guide portions in the side part of the main lens 500 with the rollers 611, 612, 613 sets the main lens 500 on a horizontal plane (namely positions the main lens 500 in the first direction X–X' and the second direction Y—Y').

An aperture 660 is formed in the middle of the lens loading section 601 of the lens moving deck 600 to project an image on the negative film which is enlarged by the main lens 500 or the auxiliary lens 550 onto the photosensitive material. As shown in FIGS. 7A and 7B, rails 621, 622 each parallel with the second direction Y–Y' are provided on the lens loading section 601 of the lens moving deck 600.

As shown in FIG. 8, slidable parts 513, 514 respectively slidable on the rails 621, 622 are formed on the side parts of the base 510 of the main lens 500. Sliding the slidable parts 513, 514 along the rails 621, 622 in contact therewith respectively positions the main lens 500 in a vertical direction.

Next, a description as to how the auxiliary lens 550 is positioned on the lens loading section 601 of the lens moving deck 600 is provided.

As shown in FIG. 9, the auxiliary lens 550 has a lens unit 551, a flange 552 extending in a direction orthogonal to the optic axis of the auxiliary lens 550, first and second engaging holes 553, 554 formed in the flange 552, and guides 555, 556, 557 each projected from the flange 552 in a direction parallel with the optic axis. The first engaging hole 553 has a substantially rectangular shape in plan view including an end surface 553a extending in a direction parallel with the projecting direction of the guide 555. The second engaging hole 554 has a substantially triangular or a trapezoidal shape in plan view including end surfaces 554a, 554b which jointly form at least a V-shape.

As shown in FIGS. 7A and 7B, a plurality of projections (for instance, three projections 631, 632, 633) are formed on the lens loading section 601 of the lens moving deck 600 to come into contact with an under surface of the flange 552 of the auxiliary lens 550 for positioning the auxiliary lens 550 in the vertical direction. Three guide grooves 634, 635, 636 are formed in the lens loading section 601 to be respectively engageable with the guides 555, 556, 557 of the auxiliary lens 550. Positioning pins 637, 638 are provided on the lens loading section 601 to be engageable with the first and second engaging holes 553, 554, respectively.

The auxiliary lens 550 is loaded in a tilting manner from the front side in FIG. 7A in Y-direction such that the guides 555, 556, 557 are respectively fitted in the guide grooves 634, 635, 636 and the positioning pins 637, 638 are respectively engaged in the first and second engaging holes 553, 554. Regions 641, 642, 643 shown by the hatched portion in FIG. 7A are formed into a slope to prevent abutment of the guides 555, 556, 557 with a bottom part of the lens loading section 601 during the above engagement/fitting.

The auxiliary lens 550 is positioned in the second direction Y–Y', by rendering the positioning pin 637 in contact with the end surface 553a of the first engaging hole 553. The auxiliary lens 550 is positioned in the first direction X–X' by rendering the positioning pin 638 in contact with the end surfaces 554a, 554b at the V-shape position of the second engaging hole 554.

As clear from FIG. 7B, a distal end of the positioning pin 637 (638) is formed such that it is set lower than the rail 621 (622) when the auxiliary lens 550 is positioned on the lens loading section 601. Also, as clear from FIG. 8, notches 514, 515 are formed in the base 510 of the main lens 500 at positions corresponding to the positioning pins 637, 638 respectively. This arrangement prevents the main lens 500 from intervening the positioning pins 637, 638 when the main lens 500 is loaded on the lens loading section 601 of the lens moving guide 600.

The guide grooves 634, 635, 636 are formed inside of the rails 621, 622 in the lens loading section 601 of the lens moving guide 600. The width of the flange 552 of the auxiliary lens 550 is set shorter than the distance between the rails 621, 622 in conformity with the above arrangement of forming the guide grooves 634, 635, 636 inside the rails 621, 622. In this arrangement, when the auxiliary lens 550 is loaded on the lens loading section 601 of the lens moving guide 600, there can be prevented an abutment of the auxiliary lens 550 with the rails 621, 622.

In the above embodiment, the zoom lens is used as the main lens 500, and the single-distance focus lens is used as the auxiliary lens 550. This invention is not limited to the above arrangement. For instance, both the main lens 500 and the auxiliary lens 550 may be single-distance focus lenses. Alternatively, both the main lens 500 and the auxiliary lens 550 may be zoom lenses with different focal length ranges. As an altered form, the single-distance focus lens is not limited to a focus lens having a predetermined fixed focal length, and may be a variable focus lens having a variable focal length in which the focal length is fixed in advance.

The above embodiment describes a case that the main lens 500 is a zoom lens provided with a motor and a drive mechanism, and accordingly, the connectors 751, 752 are provided to transmit a power and a control signal to the motor. In this arrangement, the lens storage deck 700 is provided to load the main lens 500 thereon for housing so as to eliminate a necessity of detaching the main lens 500 from the photographic processor 1 as much as possible. This invention is, however, not limited to the above arrangement. For instance, it may be possible to load the auxiliary lens 550 after opening the lid 121 of the housing member 120 and taking the main lens 500 out of the photographic processor 1. In the latter case, the lens storage deck 700 can be omitted, and accordingly, the size of the photographic processor is reduced or installing the other mechanism in the vacant space is enabled.

In the above embodiment, the mirror 403 is loaded on the lens moving guide 600. This invention is not limited to the above arrangement. Provided that the state of the film, namely, each component of three primary colors of the film can be detected by other means, the sensor 404 and the mirror 403 can be omitted.

Also, if the main lens 500 is mainly used and -the auxiliary lens 550 is seldom used in an actual printing, it may be possible to load the auxiliary lens 550 on the lens storage deck 700 and detach the main lens 500 from the photographic processor 1 when use of the auxiliary lens 550 is required. In the altered arrangement, the main lens 500 and the auxiliary lens 550 are accommodated in the photographic processor 1 in most cases. Accordingly, a space for storing the auxiliary lens 550 can be omitted.

Exploitation In Industry

As mentioned above, the photographic processor of this invention comprises a lens moving deck including a lens loading section for selectively loading a main lens and an auxiliary lens. The lens moving deck is movable in a first direction to selectively set the lens loading section at an exposed position and a retracted position adjacent to each other. In this arrangement, the main lens such as a zoom lens and the auxiliary lens such as single-distance focus lens are selectively loaded on the lens loading section. Thereby, the length of the lens moving deck (dimension in the moving direction of the lens moving deck, first direction) in this invention is shortened to, for instance, about ⅔ of the length of the lens moving deck 21 in the conventional arrangement. Further, the selective loading of the main lens and the auxiliary lens on the lens moving deck reduces the weight of the lens moving deck as a whole and accordingly enables to lessen the drive power for the lens moving deck.

It may be preferable to provide a lens storage deck for housing the main lens at the position adjacent the retracted position of the lens loading section. This arrangement eliminates a necessity that the main lens having a relatively heavy weight be detached from the photographic processor each time the lens exchange is required. In this arrangement, the auxiliary lens having a relatively small weight and compact size may be stored separately from the photographic processor. Assuming that the width of the lens moving deck (in the depthwise direction in FIGS. 2 and 3) is the same over its entirety, the lens storage deck may be provided on an extension of the lens moving deck in the lengthwise direction. In this altered arrangement, an area corresponding to the sum of the entire moving distance of the lens moving deck and the length of the lens storage deck corresponds to the area covering the length about 4/3 times of the length of the conventional lens moving deck 21. Thereby, the area necessary for covering the movement of the lens moving deck can be reduced, compared to the case where the conventional arrangement needs the area covering the length about 5/3 times of the length of the lens moving deck 21.

It may be preferable to set the lens storage deck such that it is accessible in a second direction substantially orthogonal to the first direction. Specifically, arranging the moving area for the lens moving deck and the location for the lens storage deck in a substantially L-shape relation enables to reduce the size of the enlarging lens unit in the moving direction of the lens moving deck covering the lens moving deck and the lens storage deck.

It may be preferable to set the first direction and the second direction on the horizontal plane (relative to the ground). More specifically, arranging the lens moving deck and the lens storage deck on the same horizontal plane enables smooth sliding of the main lens from the lens moving deck to the lens storage deck and vice versa without application of an force to overcome a gravitational force component, which would have, otherwise, been generated in the conventional arrangement having a tilted plane of the lens moving deck relative to the ground. Further, this arrangement prevents the main lens from displacing during storage on the lens storage deck with a simplified mechanism, and there is no need of rigid fixation of the main lens onto the lens storage deck.

It may be preferable to accommodate the lens moving deck and the lens storage deck in a housing member to protect them from external light and provide a lid near the retracted position for openably closing the housing member. In this arrangement, putting a hand inside the housing member through the lid and sliding the main lens onto the lens storage deck enables loading of the auxiliary lens onto the vacant lens loading section of the lens moving deck. This arrangement makes it possible to minimize the opening area of the housing member, and lessens a stray light component intruding into the housing member through a clearance around the lid.

It may be preferable to provide a main lens positioning means for positioning the main lens and an auxiliary lens positioning means for positioning the auxiliary lens on the lens loading section. In this arrangement, two different kinds of lenses which are totally different in arrangement can be positioned by the respective positioning means constructed suitable for their arrangement, thereby preventing an erroneous positioning.

Preferably, the main lens positioning means may be provided on a first plane substantially orthogonal to an optic axis of the main lens, the auxiliary lens positioning means is provided on a second plane substantially orthogonal to an optic axis of the auxiliary lens, and a height difference between the first plane and the second plane may be larger than a height dimension of the auxiliary lens positioning means. In this arrangement, there can be prevented an interference of the auxiliary lens positioning means with the main lens when the main lens is to be loaded on the lens loading section of the lens moving deck and an interference of the main lens positioning means with the auxiliary lens when the auxiliary lens is to be loaded on the lens loading section. Thereby, even if exchange of the main lens and the auxiliary lens is frequently repeated, there can be avoided a damage of the main lens positioning means and the auxiliary lens positioning means.

Preferably, the main lens may be a zoom lens at least a part of an optic system of which variably moves along an optic axis thereof, the photographic processor may have a motor and a drive mechanism to move the part of the optic system, and a connector for transmitting a power for driving the motor and a control signal therefor may be detachably attached to the lens loading section. In this arrangement, an electrical connection and disconnection can be effected simultaneously with sliding of the main lens between the lens loading section of the lens moving deck and the lens storage deck. Thereby, the main lens and the auxiliary lens can be exchanged speedily with a simplified arrangement.

The main lens may be preferably fixed on the lens storage deck. More specifically, detaching the main lens from the lens moving deck and fixing the same on the lens storage deck with a bolt or its like prevents the main lens and the lens moving deck from being damaged due to vibration generated during transportation and the like, which might have happened in the conventional arrangement when the photographic processor is transported from a factory to a laboratory.

What is claimed is:

1. A photographic processor comprising a lens moving deck including a lens loading section adapted for selectively loading a main lens and an auxiliary lens thereon, the lens moving deck movable in a first direction to selectively set the lens loading section at an exposed position and a retracted position adjacent to each other.

2. The photographic processor according to claim 1 further comprising a lens storage deck adjacent the retracted position for selectively receiving the main lens and the auxiliary lens thereon.

3. The photographic processor according to claim 2, the lens storage deck is so set as to be accessible in a second direction substantially orthogonal to the first direction.

4. The photographic processor according to claim 1, wherein the first direction and the second direction are both set horizontal.

5. The photographic processor according to claim 1, further comprising a housing member accommodating the lens moving deck and shielding at least the lens moving deck from external light and the housing member has an openably closed lid near the retracted position.

6. The photographic processor according to claim 1, further comprising a main lens positioning means provided in the lens loading section for positioning the main lens and an auxiliary lens positioning means provided in the lens loading section for positioning the auxiliary lens.

7. The photographic processor according to claim 1, wherein the main lens positioning means is provided on a first plane substantially orthogonal to an optic axis of the main lens, the auxiliary lens positioning means is provided on a second plane substantially orthogonal to an optic axis of the auxiliary lens, and a height difference between the first plane and the second plane is larger than a height dimension of the auxiliary lens positioning means.

8. The photographic processor according to claim 1, wherein the main lens is a zoom lens at least a part of an optic system of which variably moves along an optic axis thereof, the photographic processor has a motor and a drive mechanism to move the part of the optic system, and connectors are detachably mounted on the main lens and the lens loading section respectively to transmit a power for driving the motor and a control signal therefor to the motor.

9. The photographic processor according to claim 2, wherein the main lens is fixedly attachable to the lens storage deck.

* * * * *